United States Patent
Li et al.

(10) Patent No.: US 12,189,392 B2
(45) Date of Patent: Jan. 7, 2025

(54) AUTOMATIC ROW ALIGNMENT DRIVING SYSTEM AND METHOD FOR HIGH STEM CROP HARVESTER

(71) Applicant: FJ Dynamics Technology Co., Ltd, Xiangyang (CN)

(72) Inventors: Hong-Xin Li, Xiangyang (CN); Bin Li, Xiangyang (CN); Shuo Qin, Xiangyang (CN); Qing-Quan Wang, Xiangyang (CN); Bo Wang, Xiangyang (CN); Yuan Yao, Xiangyang (CN); Di Wu, Xiangyang (CN)

(73) Assignee: FJ Dynamics Technology Co., Ltd, Xiangyang (CN)

( * ) Notice: Subject to any disclaimer, the term of this patent is extended or adjusted under 35 U.S.C. 154(b) by 148 days.

(21) Appl. No.: 17/706,820

(22) Filed: Mar. 29, 2022

(65) Prior Publication Data

US 2022/0317688 A1    Oct. 6, 2022

(30) Foreign Application Priority Data

Apr. 1, 2021    (CN) .......................... 202110358091.6

(51) Int. Cl.
*A01D 41/127*    (2006.01)
*A01D 45/02*    (2006.01)
(Continued)

(52) U.S. Cl.
CPC ........... *G05D 1/0212* (2013.01); *A01D 45/02* (2013.01); *A01D 57/22* (2013.01); *B60K 35/00* (2013.01);
(Continued)

(58) Field of Classification Search
CPC .... A01D 41/1278; A01D 45/02; A01D 57/22; G05D 1/0212; B60K 35/00; B60K 35/28;
(Continued)

(56) References Cited

U.S. PATENT DOCUMENTS 4,197,690 A *    4/1980    Eistert ................ A01D 41/1278
                                                                180/401
7,165,628 B2 *    1/2007    Taylor .................... A01D 33/00
                                                                171/45
(Continued)

FOREIGN PATENT DOCUMENTS

CN    101578938 A    11/2009
EP    2119334 A1    11/2009
(Continued)

*Primary Examiner* — Gonzalo Laguarda
(74) *Attorney, Agent, or Firm* — ScienBiziP, P.C.

(57) ABSTRACT

A system and method for automatic row alignment driving by a harvester when harvesting above-ground crops includes an elastic row sensing module, a processing module, a controlling module, and a steering module. The elastic row sensing module is disposed on a front grain thresher/grain isolator of the harvester, collecting data as to physical contact with the crop. The elastic row sensing module includes a deformable elastomer in contact with the high stem crop, the sensor detects and reports deformation of the elastomer. The processing module determines current alignment state of the harvester and the controlling module determines any corrective steering signal for the harvester. The steering module controls steering direction.

9 Claims, 5 Drawing Sheets

(51) Int. Cl.
    *A01D 57/22*     (2006.01)
    *B60K 35/00*     (2006.01)
    *B62D 15/02*     (2006.01)
    *G05D 1/00*     (2006.01)
    *B60K 35/28*     (2024.01)

(52) U.S. Cl.
    CPC ........ B62D 15/029 (2013.01); *A01D 41/1278* (2013.01); *B60K 35/28* (2024.01); *B60K 2360/167* (2024.01); *B60K 2360/168* (2024.01); *G06F 2218/08* (2023.01)

(58) Field of Classification Search
    CPC ........ B60K 2360/167; B60K 2360/168; B62D 15/029; G06F 2218/08
    See application file for complete search history.

(56) References Cited

U.S. PATENT DOCUMENTS

| | | | | |
|---|---|---|---|---|
| 7,716,905 | B2 * | 5/2010 | Wilcox | A01D 41/1278 56/10.2 E |
| 11,064,653 | B2 * | 7/2021 | Zielke | A01D 41/127 |
| 11,678,607 | B2 * | 6/2023 | Zielke | A01D 41/1271 56/10.2 R |
| 2015/0334920 | A1 | 11/2015 | Schleicher et al. | |
| 2020/0053962 | A1 | 2/2020 | Dix et al. | |
| 2023/0142286 | A1 * | 5/2023 | Morris | G05D 1/0219 701/50 |

FOREIGN PATENT DOCUMENTS

| | | |
|---|---|---|
| EP | 3092886 A1 | 11/2016 |
| EP | 3620039 A1 | 3/2020 |
| JP | S54-160617 A | 12/1979 |
| JP | S57-142165 A | 9/1982 |
| JP | S57-145029 A | 9/1982 |
| JP | H06-319306 A | 11/1994 |

\* cited by examiner

AUTOMATIC ROW ALIGNMENT DRIVING SYSTEM AND METHOD FOR HIGH STEM CROP HARVESTER

TECHNICAL FIELD

The present disclosure relates to the field of agriculture, in particular to an automatic row alignment driving system and method for high stem crop harvester.

BACKGROUND

In vast lands with sparse rural population, agricultural production urgently needs to develop towards automation and intelligence. The automation and smart-acting abilities of agricultural machinery and equipment is the premise and foundation of large-scale cultivation of modern agriculture. There are many kinds of ridge crops, such as corn, sorghum, sugarcane, and other high stem crops. When harvesting the above high stem crops, especially corn, the driver needs to constantly adjust his forward direction to ensure precise operation. While driving the harvesting machine, the driver must be drive carefully, and observe the conditions and progress of the harvesting, in addition to other operation. Manual operation increases the operation cost, and extended operation time may exhaust the driver, resulting in declining in operation efficiency and precision.

Therefore, improvement is desired.

SUMMARY OF THE INVENTION

The present disclosure provides an automatic row alignment driving system and method for high stem crop harvester, so as to reduce the workload of the harvester driver and improve the harvesting efficiency.

In order to achieve this purpose, on one hand, the embodiment of the present disclosure provides an automatic row alignment driving system of high stem crop harvester, including:

an elastic row sensing module is disposed on a grain divider of the harvester, and configured to make contact with the high stem crop and collect contact data; wherein the elastic row sensing module comprises multiple elastomers and multiple sensors, the elastomers are deformed by physical contact with the high stem crop, and the sensors are configured to detect deformation of the elastomers and generate the contact data;

a processing module is configured to determine current alignment state of the harvester according to the contact data;

a controlling module is configured to determine steering of the harvester according to the current alignment state; and A steering module is configured to control the harvester to drive in alignment according to a steering signal.

Optionally, in the automatic row alignment driving system provided by some embodiments, the elastic row sensing module includes a first sensor and a second sensor, the elastomer is stretched or laid out across the front of harvester, the first sensor is disposed on left portion of the elastomer, and the second sensor is disposed on right portion of the elastomer.

Optionally, in the automatic row alignment driving system provided by some embodiments, the contact data includes a first sensor data and a second sensor data, the processing module is configured to extract a feature value based on the first sensor data to obtain a first feature value, and extract a feature value based on the second sensor data to obtain a second feature value. The first feature value and the second feature value are compared with a preset feature threshold to determine left-right alignment gap states, and determine whether the alignment is abnormal according to the left-right alignment gap states. An offset direction and an offset amount is calculated if, according to the first sensor data and the second sensor data, the alignment is found to be abnormal.

Optionally, in the automatic row alignment driving system provided by some embodiments, the left-right alignment gap states include a gap on the left, no gap on the left, a gap on the right and no gap on the right; wherein the determined left-right alignment gap states includes: if the first feature value is less than or equal to the preset feature threshold, the processing module determines there is a gap on the left, if the first feature value is greater than the preset feature threshold, the processing module determines there is no gap on the left. If the second feature value is less than or equal to the preset feature threshold, the processing module determines there is a gap on the right, if the second feature value is greater than the preset feature threshold, it is determined that there is no gap on the right.

Optionally, in the automatic row alignment driving system provided by some embodiments, the controlling module is configured to determine a steering direction and a steering angle of the harvester according to the offset direction and the offset amount, and generate a corrective steering signal according to the steering direction and the steering angle.

Optionally, in the automatic row alignment driving system provided by some embodiments, the system further includes an alarm module, the processing module is configured to generate a warning signal when the left-right alignment gap state is a gap on the left and a gap on the right; and the alarm module is configured to send a light alarm or a sound alarm according to the warning signal.

Optionally, in the automatic row alignment driving system provided by some embodiments, the system further includes an input module, the operation parameters comprise operation spacing, offset values, sensor calibration, and voltage feature thresholds; and the operation parameters are used in conjunction with the contact data to generate the corrective steering signal.

Optionally, in the automatic row alignment driving system provided by some embodiments, the system further includes a positioning module, an attitude module, and a display module, the positioning module is configured to determine current position of the harvester, the attitude module is configured to determine current body state of the harvester, the display module is configured to display operating state of the harvester according to the current position, the current body state, and the current alignment state.

An embodiment of the present disclosure provides an automatic row alignment driving method of high stem crop harvester, including:

obtaining contact data generated by an elastic row sensing module in contact with high stem crop, and obtaining operation parameters entered by a user;

determining current alignment state of the harvester according to the contact data and the operation parameters;

determining steering signal of the harvester according to the current alignment state; wherein the steering signal comprises a steering direction and a steering angle of the harvester; and Controlling a steering module of the harvester to execute a corrective steering signal, to control the harvester to drive in a required alignment.

Optionally, in the automatic row alignment driving method provided by some embodiments, the contact data comprises a first sensor data and a second sensor data; wherein determining current alignment state of the harvester according to the contact data and the operation parameters comprises:

extracting a feature value based on the first sensor data to obtain a first feature value, and extracting the feature value based on the second sensor data to obtain a second feature value;

comparing the first feature value and the second feature value with preset feature thresholds to determine left-right alignment gap states;

determining whether the alignment is abnormal according to the left-right alignment gap states; and Determining an offset direction and an offset amount according to the first sensor data and the second sensor data if the alignment is abnormal.

In the embodiment of the present disclosure, the elastomer arranged on the grain divider in the elastic row sensing module is in direct contact with the high stem crop and is deformed by contact, the sensor in the elastic row sensing module generates the contact data according to the deformation of the elastomer, the processing module analyzes the current alignment state according to the contact data, then the controlling module calculates the required steering direction and the steering angle according to the current alignment state, and sends the steering direction and the steering angle to the steering module through the steering signal. Finally, the steering module completes the corrective steering action according to the steering signal to realize the automatic row alignment driving of the harvester. The system is based on the elastic row sensing module to assist the harvester in automatic row operation, and there is no need to make modifications to the harvester and the harvesting operation of the harvester is not affected. The embodiment of the present disclosure can automatically align the rows when the harvester is harvesting, realize accurate harvesting, improve the harvesting efficiency and the quality of harvested crops, and reduce the work of the driver by relieving him of constant manual alignment or re-alignment.

DETAILED DESCRIPTION

The following description is used to disclose the present disclosure so that those skilled in the art can implement the present disclosure. The preferred embodiments in the following description are only examples, and those skilled in the art can think of other obvious variations. In addition, it should be noted that, for ease of description, only some but not all structures related to the present disclosure are shown in the drawings.

Before discussing the exemplary embodiments in more detail, it should be mentioned that some exemplary embodiments are described as processes or methods depicted as flowcharts. Although the flowchart describes the steps as sequential processing, many of them can be implemented in parallel, concurrently, or at the same time. In addition, the order of the steps can be rearranged. When its operation is completed, the process may be terminated, but may also have additional steps not included in the drawings. Processing can correspond to methods, functions, procedures, subroutines, subroutines, and so on.

In addition, the terms "first", "second" and the like may be used herein to describe various directions, actions, steps or elements, but these directions, actions, steps or elements are not limited by these terms. These terms are used only to distinguish a first direction, action, step, or element from another direction, action, step, or element. For example, without limiting the scope of the present disclosure, the first module can be called the second module. Similarly, the second module can be called the first module. Both the first module and the second module are modules, but they are not the same module. The terms "first", "second", etc. cannot be understood as indicating or implying relative importance or implicitly indicating the number of indicated technical features. Thus, the features defining "first" and "second" may explicitly or implicitly include one or more of the features. In the description of the embodiment of the present disclosure, "a plurality of" means at least two, such as two, three, etc., unless otherwise specifically defined.

Embodiment 1

The embodiment of the present disclosure provides an automatic row alignment driving system for high stem crop harvester. The automatic row alignment driving can be applied to all kinds of high stem crop harvesters, such as corn harvester. The high stem crop harvester based on the system can harvest efficiently by itself, reduce manual operation, reduce the workload, and improve the harvest efficiency.

Figure 1:
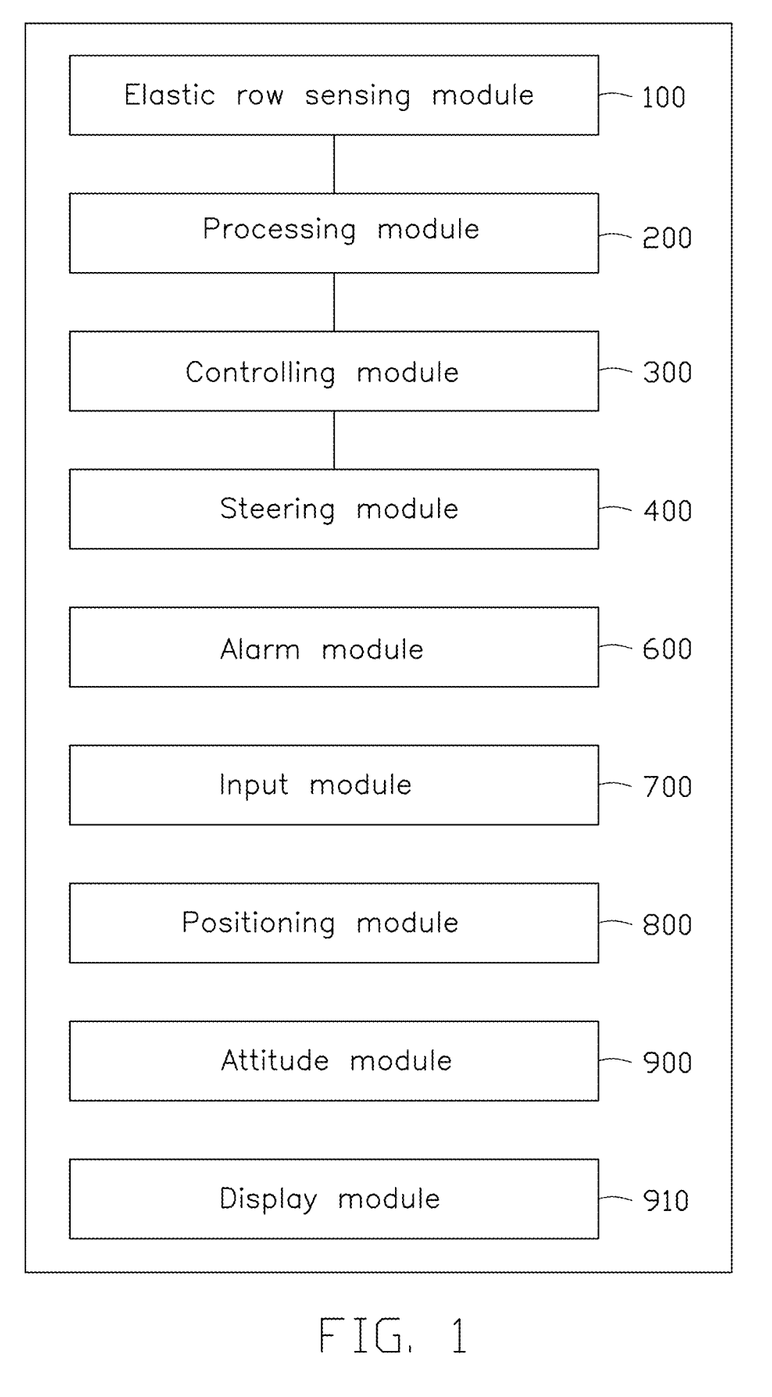
FIG. 1 is a schematic diagram of an automatic row alignment driving system for high stem crop harvester according to a first embodiment of the present disclosure.

FIG. 1 illustrates an automatic row alignment driving system for high stem crop harvester in accordance with an embodiment of the present disclosure.

The automatic row alignment driving system includes an elastic row sensing module 100, a processing module 200, a controlling module 300, and a steering module 400.

The elastic row sensing module 100 is arranged on a grain divider of a harvester 1000 for physically contacting high stem crops and collecting data as to the physical contact. The elastic row sensing module 100 includes multiple elastomers and multiple sensors, the elastomers can deform when in contact with the high stem crops, and the sensors are used to detect the deformation of the elasticity and generate contact data.

The conventional high stem crop harvester needs to use a grain divider when harvesting. For example, in the self-propelled corn harvester, the grain divider is installed at the front end of the header, which is mainly used to support and distribute the corn plants, so that the corn plants can enter a stem pulling channel smoothly to gather the harvest. In order to ensure effective harvesting, it is necessary to ensure that the grain divider can accurately align with high stalk crops such as corn. In view of this, the elastic row sensing module 100 is set on the grain divider in the embodiment, the elastic row sensing module 100 is used to directly contact high stem crops and collect contact data during harvest of crops, so as to determine whether the grain divider is in line with the high stem crops. If there is deviation, harvesting will be less effective, and the harvester will need adjustment.

In the embodiment, the elastic row sensing module 100 adopts the structure of the elastomers and the sensors, when the harvester 1000 is working, the elastomer will directly contact the high stem crops, and as the harvester 1000 moves forward, the elastomer will deform by contact with the high stem crops. The sensor is used to detect the degree of deformation of the elastomer. If the deformation of the elastomer reaches certain level, it indicates that there is a deviation between the positioning of the grain divider and the high stem crop. In general, a harvester is provided with a plurality of the grain dividers in front of the header. The elastic row sensing module 100 set on any one of the grain dividers can be used for row adjustment. However, the elastic row sensing module 100 being disposed on the grain divider close to the center of the harvester is more convenient for allow for adjustment, and the perception of a deviation is more accurate. In some embodiments, when the number of the grain dividers is odd, it is preferable to fix the elastic row sensing module 100 on the middle grain divider. When the number of the grain dividers is even, it is preferable to fix the elastic row sensing module 100 on the first grain divider in the middle of left portion or the first grain divider in the middle of right portion.

In some embodiments, it is preferable to set the horizontal section of the elastomer as an arc. The outer side of the arc is facing the high stem crop, which allows the high stem crop slide along the outer side of the elastomer to the side away from the elastomer when in contact with the elastomer, so as to ensure effective harvesting.

The processing module 200 is used to determine the current alignment state of the harvester according to the contact data. The processing module 200 is used to process the contact data detected by the elastic row sensing module 100, mainly for feature extraction and calculation, so as to obtain the current alignment state of the harvester according to the original sensor data. The current alignment state is used as a reference to determine whether the grain divider is aligned with the high stem crop, the current alignment state specifically includes the offset direction and offset distance. When the offset distance is less than a certain threshold, the high stem crop is deemed aligned with the grain divider. Otherwise, the high stem crop is deemed to be not aligned with the grain divider.

The processing module 200 is connected to the sensor of the elastic row sensing module 100. The processing module 200 can directly obtain the data collected by the sensor, extract and calculate the features of the data collected by the sensor, and the extracted features are used to determine the points of contact between the elastomer and the high stem crop, to determine the current alignment state of the grain divider installed with the elastic row sensing module 100.

The controlling module 300 is used to determine the steering signal of the harvester according to the current alignment state.

The controlling module 300 is the main control center of the harvester and is used to send various control signals to control the operation of the harvester. The controlling module 300 also stores information such as operation parameters of the harvester, and the controlling module 300 can generate various control signals. The steering signal is a control signal generated when the current alignment state obtained by the processing module 200 includes deviation direction and deviation angle, which is used to control a steering actuator (such as hydraulic cylinder, etc.) to achieve steering. In one embodiment, the controlling module 300 may be an electronic controller.

The controlling module 300 is connected to the processing module 200 to receive the data uploaded by the processing module 200, the controlling module 300 can obtain the current alignment state uploaded by the processing module 200, calculate the extent of any adjustment of the driving direction of the harvester according to the current alignment state and the operation parameters of the harvester, so as to keep the high stem crop and the grain divider aligned. The current alignment state includes offset direction and offset, a formula for calculating the steering direction and steering angle of the harvester according to the offset direction and offset is preset in the controlling module 300, and then a specific steering signal is generated according to the steering direction and the steering angle. The controlling module 300 is used to determine the steering direction and the steering angle of the harvester according to the offset direction and the offset amount, and generate a steering signal according to the steering direction and the steering angle.

The steering module 400 is used to control the harvester to drive in a certain direction according to the steering signal. The steering module 400 is the steering actuator of the harvester, and the steering module 400 is used to adjust the steering wheel direction of the harvester in real time according to the steering signal, so as to control the harvester to drive according to the requirements of the steering signal. Exemplarily, the steering module 400 includes an electro-hydraulic proportional valve, a hydraulic cylinder, and a steering wheel, and the steering signal is used to govern the actions of the electro-hydraulic proportional valve and the hydraulic cylinder to drive straight or to turn, thereby adjusting the driving direction of the harvester.

Figure 2:
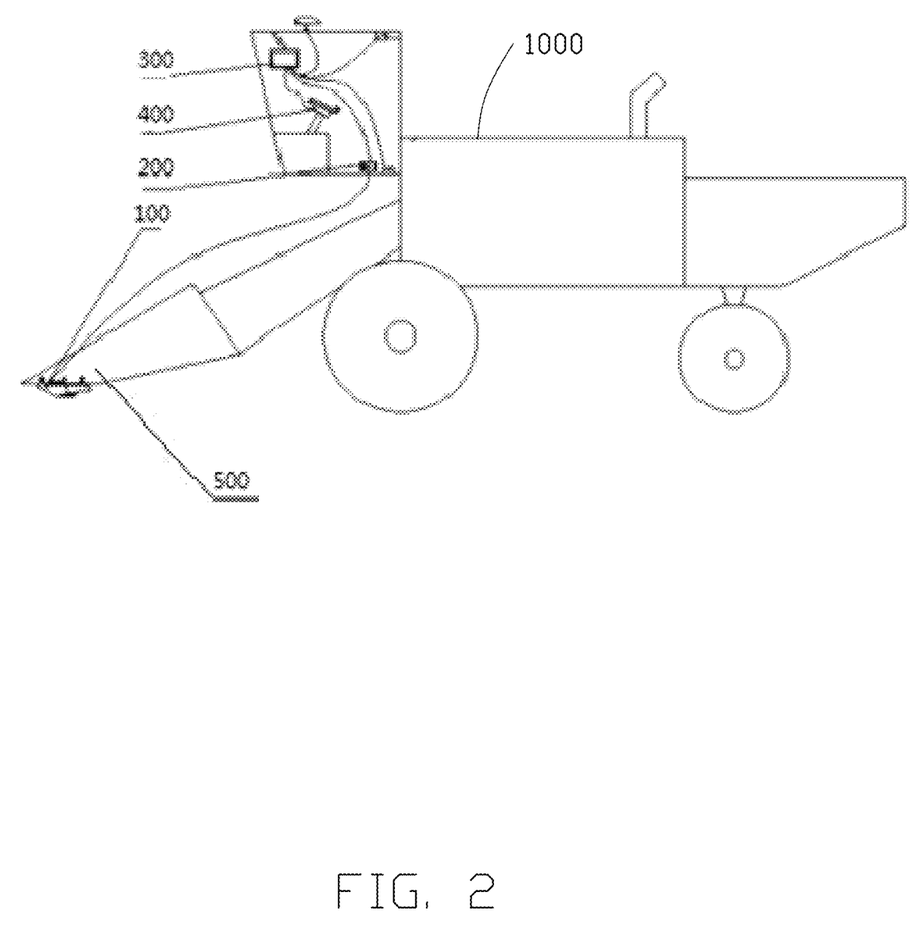
FIG. 2 is a schematic diagram of a high stem crop harvester according to a first embodiment of the present disclosure.
Figure 3:
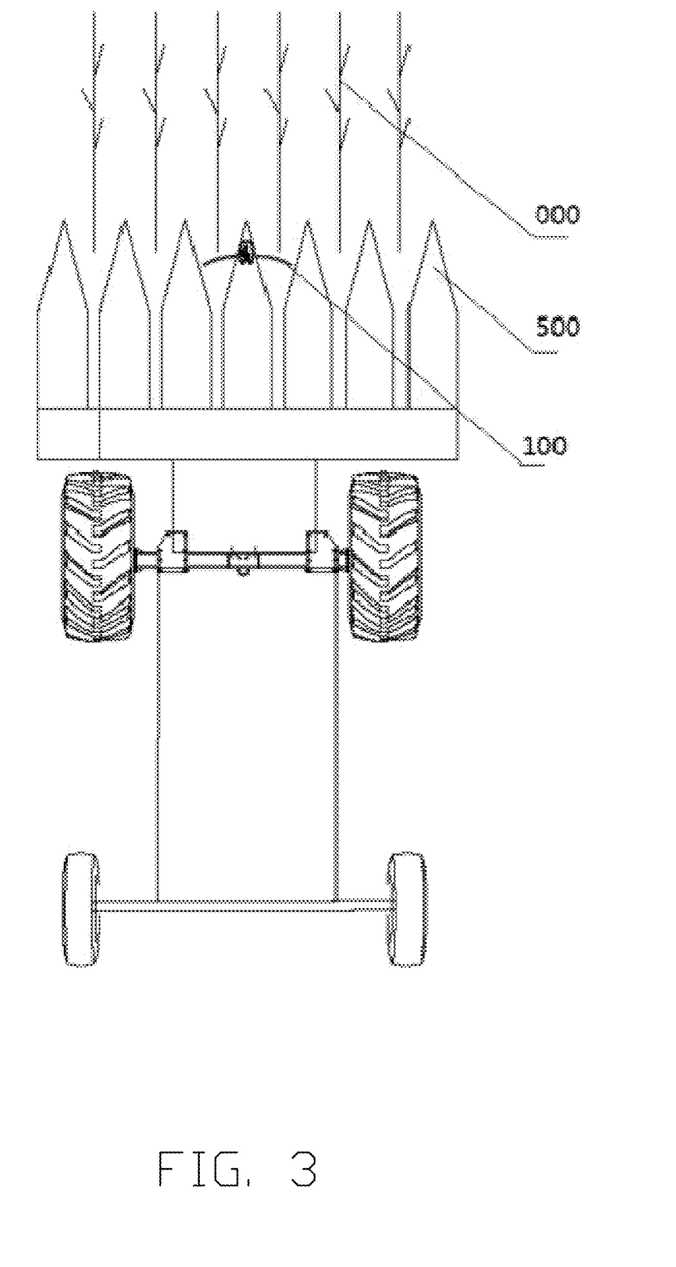
FIG. 3 is an operation diagram of the high stem crop harvester according to the first embodiment of the present disclosure.

In order to facilitate understanding, a specific example is used to illustrate the automatic row alignment driving system provided in the embodiment. FIG. 2 shows a schematic diagram of the operation of a corn harvester. As shown in FIG. 2, the elastic row sensing module 100 is arranged on the grain divider 500, and the elastic row sensing module 100 is connected to the processing module 200. The processing module 200 is connected to the controlling module 300, and the controlling module 300 is connected to the steering module 400. FIG. 3 shows a top view of the corn harvester. In FIG. 3, in this harvester, the elastic row sensing module 100 is arranged at the front end of the grain divider 500, and the elastic row sensing module 100 will directly contact the corn 000 as the corn harvester moves forward. When the corn 000 and the crop divider 500 are kept aligned, the elastic row sensing module 100 detects that deformation on both sides is generally the same (considering that it is impossible for each cornstalk to grow exactly the same, some error is allowed). When the corn 000 and the grain divider 500 are not aligned, the elastic row sensing module 100 detects difference in deformation on each side. For example, when the harvester deviates to the left, the right side of the elastic row sensing module 100 will contact and deform the corn 000 first, as the harvester moves forward, the left side of the elastic row sensing module 100 contacts and deforms with the corn 000 later, and this contact data records the above-mentioned deformations in time. When the processing module 200 receives the contact data, the processing module 200 calculates the offset direction and the offset distance between the grain divider 500 and the corn 000 according to the contact data. When the above harvester is offset to the left, the offset direction is the left. The controlling module 300 calculates the steering direction and the steering angle for controlling the steering module 400 according to the offset direction and the offset distance. For example, if the offset direction calculated by the processing module 200 is to the left and the offset amount (offset distance) is $X_1$, the steering direction is correct, and the steering angle is Y. $Y=k_1 \cdot X_1$, $k_1=a \cdot v_1^2+b \cdot w_1+c$, $v_1$ represents the driving speed of the harvester, $w_1$ represents the working spacing (the grain divider spacing) of the harvester, and a, b, and c are preset constants. The steering module 400 receives the steering signal, and can apply continuous adjustment to the steering wheel of the harvester according to the steering direction and the steering angle in the steering signal. The contact data will change again with a different driving direction, the offset amount will also change continuously, and the steering angle will change accordingly, the steering wheel will be adjusted continuously during driving, and finally desired alignment will be realized.

The embodiment provides an automatic row alignment driving system for high stem crop harvester, the elastomer arranged on the grain divider in the elastic row sensing module 100 is in direct contact with the high stem crop and is deformed by contact, the sensor in the elastic row sensing module 100 generates the contact data according to the deformation of the elastomer, the processing module 200 analyzes the current alignment state according to the contact data, then the controlling module 300 calculates the steering direction and the steering angle according to the current alignment state, and sends the steering direction and the steering angle to the steering module 400 through the steering signal. Finally, the steering module 400 completes the steering action according to the steering signal to realize the automatic row alignment driving of the harvester. The system is based on the elastic row sensing module 100 to assist the harvester in automatic row operation, and there is no need to make further modifications to the harvester and the harvesting operation of the harvester is not affected. The system can automatically align the rows when the harvester is harvesting, realize accurate harvesting, improve the harvesting efficiency, and the quality of harvested crops, and reduce the work of the driver without manual alignment.

Embodiment 2

The Embodiment 2 of the present disclosure further provides an automatic row alignment driving system for high stem crop harvester, which is further explained and explained on the basis of the Embodiment 1 of the present disclosure. For example, the specific structure of the elastic row sensing module 100 and determining the current alignment state according to the contact data, includes:

The elastic row sensing module 100 includes multiple elastomers, a first sensor and a second sensor. The ends of the elastomer are on each side of the grain divider 500. The first sensor is arranged on the left side of the center of the elastomer (not on the elastomer). The first sensor is used to generate first contact data according to the deformation of the left side of the elastomer. The second sensor is arranged on the right side of the center of the elastomer (not on the elastomer). The second sensor is used to generate second contact data according to the deformation of the right side of the elastomer.

In this embodiment, the structure and function of the elastic row sensing module 100 are further explained. The elastic row sensing module 100 is used to detect the alignment between the high stem crops on both sides of the grain divider 500 (referring to the grain divider 500 fixed with the elastic row sensing module 100) and the harvester, and the elastic row sensing module 100 detects relative positions between the high stem crops on each side of the grain divider 500 on the harvester. The elastomer extends to both sides of the grain divider 500 from the grain divider 500, and the two ends of the elastomer are located on the left and right sides of a grain divider 500, to contact the high stem crops on both sides of the grain divider 500. The first sensor is arranged on the left side of the center of the elastomer to detect the contact data generated by the contact between the elastomer and the high stem crop on the left side of the grain divider 500, that is, the first sensor data. The second sensor is arranged on the right side of the center of the elastomer to detect the contact data generated by the contact between the elastomer and the high stem crop on the right side of the grain divider 500, that is, the second sensor data. The contact data includes the first sensor data and the second sensor data.

When the processing module 200 receives the first sensor data and the second sensor data, the processing module 200 analyzes the contact between the two sides of the elastomer and the high stem crop according to the first sensor data and the second sensor data, so as to determine whether the corn and the grain divider 500 are aligned and the specific degree of deviation when they are not aligned. In the embodiment, the processing module 200 may be an electronic processor. The process of the processing module 200 analyzing the current alignment state includes steps S210-240 (not shown).

At step S210, extracting the feature value based on the first sensor data to obtain the first feature value, and extracting the feature value based on the second sensor data to obtain the second feature value.

In the embodiment, a preset algorithm for processing the sensor data is stored in the processing module 200. After receiving the first sensor data and the second sensor data, the feature value is extracted through the preset algorithm to obtain the first feature value and the second feature value. According to the specific structure of the elastic row sensing module 100, different feature values can be adopted, such as angle value, and distance value. In the embodiment, the first sensor and the second sensor detect deformation of the elastomer, take the distance between the area on the elastomer and the sensor as the basis for analysis, so the feature value is the distance value.

At step S220, comparing the first feature value and the second feature value with the preset feature threshold to determine the left-right alignment gap state.

The first sensor and the second sensor detect the distances between the sensor and the elastomer. When the elastomer is deformed unevenly, the distance between the first sensor and the second sensor and the elastomer will also change, the deformation of the elastomer can be determined according to the different distance, so as to determine whether the grain divider 500 is aligned with the high stem crop. In the embodiment, the distance between the two sensors and the elastomer is represented by the left-right alignment gap state. The left-right alignment gap states include a gap on the left, no gap on the left, a gap on the right and no gap on the right. The determining of the left-right alignment gap state includes: if the first feature value is less than or equal to the preset feature threshold, it is determined that there is a gap on the left, otherwise, there is no gap on the left; and if the second feature value is less than or equal to the preset feature threshold, it is determined that there is a gap on the right, otherwise, there is no gap on the right. As mentioned earlier, the first sensor is located on the left side of the center of the elastomer, and there are two states between the first sensor and the elastomer: a gap on the left and no gap on the left. Similarly, there are two states between the second sensor and the elastomer: a gap on the right and no gap on the right.

At step S230, determining whether alignment is abnormal according to the left-right alignment gap state.

After determining the left-right alignment gap state, the processing module 200 further determines whether the current harvester is correctly aligned. There are actually four kinds of left-right alignment gap states. If there is gap on the left and there is no gap on the right, the alignment is determined as abnormal. If there is no gap on the left and there is a gap on the right, the alignment is abnormal. If there is no gap on the left and there is no gap on the right, it is necessary to further determine whether the distance between the two sensors and the elastomer is equal (a certain error is allowed) according to the data of the two sensors, if it is not equal, abnormal alignment is determined. If there is a gap on the left, and there is a gap on the right, the data is abnormal, and the harvester may have deviated completely from a desired path.

At step S240, determining the offset direction and the offset amount or determining that the data is abnormal according to the first sensor data and the second sensor data if the alignment is abnormal.

According to step S230, when there is a gap on the left and no gap on the right, the offset direction is correct, and the offset amount needs to be determined based on the second sensor data on the right. When there is no gap on the left, there is a gap on the right, and the offset direction is left, the offset amount needs to be determined by the first sensor data on the left. When there is no gap on the left and no gap on the right, it is necessary to further determine the distance between the two sensors and the elastomer based on the data of the two sensors at the same time, and then determine whether there is an offset according to the distance (abnormal alignment). If an offset occurs, the offset direction and the offset distance need to be combined with the first sensor data and the second sensor data. When there is a gap on the left and a gap on the right, it is determined that the data is abnormal.

Figure 4:
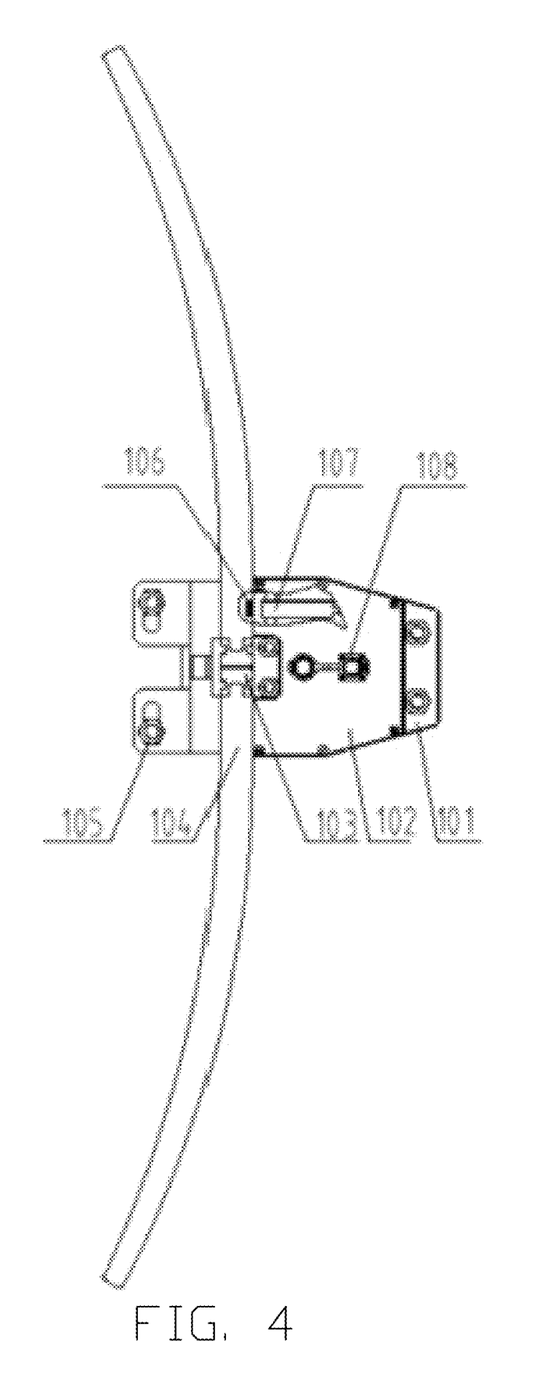
FIG. 4 is a schematic diagram of an elastic row sensing module of the high stem crop harvester according to a second embodiment of the present disclosure.

For ease of understanding, the structure of the elastic row sensing module 100 is explained with a specific example. FIG. 4 is a schematic structural diagram of an elastic alignment sensing module in the automatic row alignment driving system of the high stem crop harvester, as shown in FIG. 4:

The elastic row sensing module 100 includes a housing 101, a sealing cover 102, a pressing block 103, an elastomer 104, a mounting plate 105, a first sensor trigger 106, a first sensor 107 (including a second sensor and a second sensor trigger, neither shown), and a connector 108. The first sensor trigger 106 and the second sensor trigger are fixed in the elastomer 104. The elastomer 104 is fixed to the pressing block 103, preferably by gluing. The pressing block 103 is fixed on the housing 101, preferably by means of bolts. The first sensor 107 and the second sensor are fixedly installed on the housing 101, and the first sensor 107 is installed to be coaxial with the first sensor trigger 106 and maintain a set distance.

The second sensor is installed to be coaxial with the second sensor trigger and maintain a set distance, preferably 5 mm.

The connector 108 is mounted on the sealing cover 102, the connector 108 is connected to the first sensor 107 and the second sensor, the connector 108 is used for power supply and communication for the first sensor 107 and the second sensor. The sealing cover 102 is fixed on the housing 101 for dustproofing, waterproofing, and oil-proofed functions; the mounting plate 105 is connected to the grain divider 500 for fixing the elastic row sensing module 100 on the grain divider 500.

Optionally, in the automatic row alignment driving system of the high stem crop harvester provided by some embodiments, an alarm module 600 is also provided. The alarm module 600 includes a loudspeaker or buzzer and indicator lights to indicate abnormal harvester operation. The processing module 200 is further used to generate a warning signal when the left-right alignment gap state is that there is a gap on the left and a gap on the right. The alarm module is used to issue an illuminating warning or a sound warning according to the warning signal. When the left-right alignment gap state is that there is a gap on the left and there is a gap on the right, it means that the data is abnormal, it may be that the harvester operation is completed or the harvester has completely deviated from the operation area (for example, the form and direction change drastically due to collision with ground obstacles).

In the automatic row alignment driving system of the high stem crop harvester provided by some embodiments, an input module 700 is also provided. The input module 700 is used to obtain the operation parameters entered by the user. The operation parameters can include operation spacing, offset values, sensor calibration, and voltage feature threshold. The operation parameters are used in conjunction with the contact data to generate steering signals. As mentioned above, the controlling module 300 also stores information such as operation parameters of the harvester for generation of various control signals. The operation parameter information needs to be input through a certain channel, the input module 700 may be a touch screen, a keyboard, and other input devices. Of course, the output module and the controlling module 300 can also be integrated into a display and control module, which can realize the functions of input and control at the same time.

In the automatic row alignment driving system of the high stem crop harvester provided by some embodiments, a positioning module 800, an attitude module 900, and a display module 910 are also provided. The positioning module 800 is used to determine the current position of the harvester. The attitude module 900 is used to determine current body state of the harvester. The display module 910 is used to display the operating state of the harvester according to the current position, the current body state, and the current alignment state. The operating state of the harvester includes a variety of information such as offset, offset direction, operation speed, operation mode, and operation row spacing. Optionally, in some alternative embodiments, the display module 910, the input module 700 and the controlling module 300 may be integrated into one module, for example, the display and control module may have three functions of output, display, and control at the same time.

In the automatic row alignment driving system of the high stem crop harvester provided by some embodiments, a manual driving module is also provided. When the processing module 200 determines that the data is abnormal, the process of automatic determination of the steering signal of the harvester by the controlling module 300 is ended, and the manual driving module obtains the manual driving information of the driver and generates a manual driving signal. The steering module 400 controls the harvester to drive according to the manual driving signal. Optionally, in some alternative embodiments, in addition to switching to manual driving when the processing module 200 determines that the data is abnormal, the manual driving module can also switch to manual driving when the input module receives a manual driving instruction.

The automatic row alignment driving system of the high stem crop harvester provided in this embodiment further provides the specific structure of the elastic row sensing module 100, the current alignment state can be determined according to the first sensor data and the second sensor data, and then it can be determined whether the harvester is normally aligned according to the current alignment state. The system can not only determine whether the harvester is aligned, but also can generate a warning signal when data as to an abnormality is received, reminding the driver to check the specific conditions of the harvester operation, which improves the safety of the operation.

Embodiment 3

The Embodiment 3 of the present disclosure further provides an automatic row alignment driving method for high stem crop harvester, which is applied to various high stem crop harvesters. Based on the automatic row alignment driving system of the high stem crop harvester provided by any of the foregoing embodiments of the present disclosure, the high stem crop harvester can perform self-alignment when the high stem crop harvester is harvesting, thereby reducing manual operation, reducing driver work, and improving harvesting efficiency.

Figure 5:
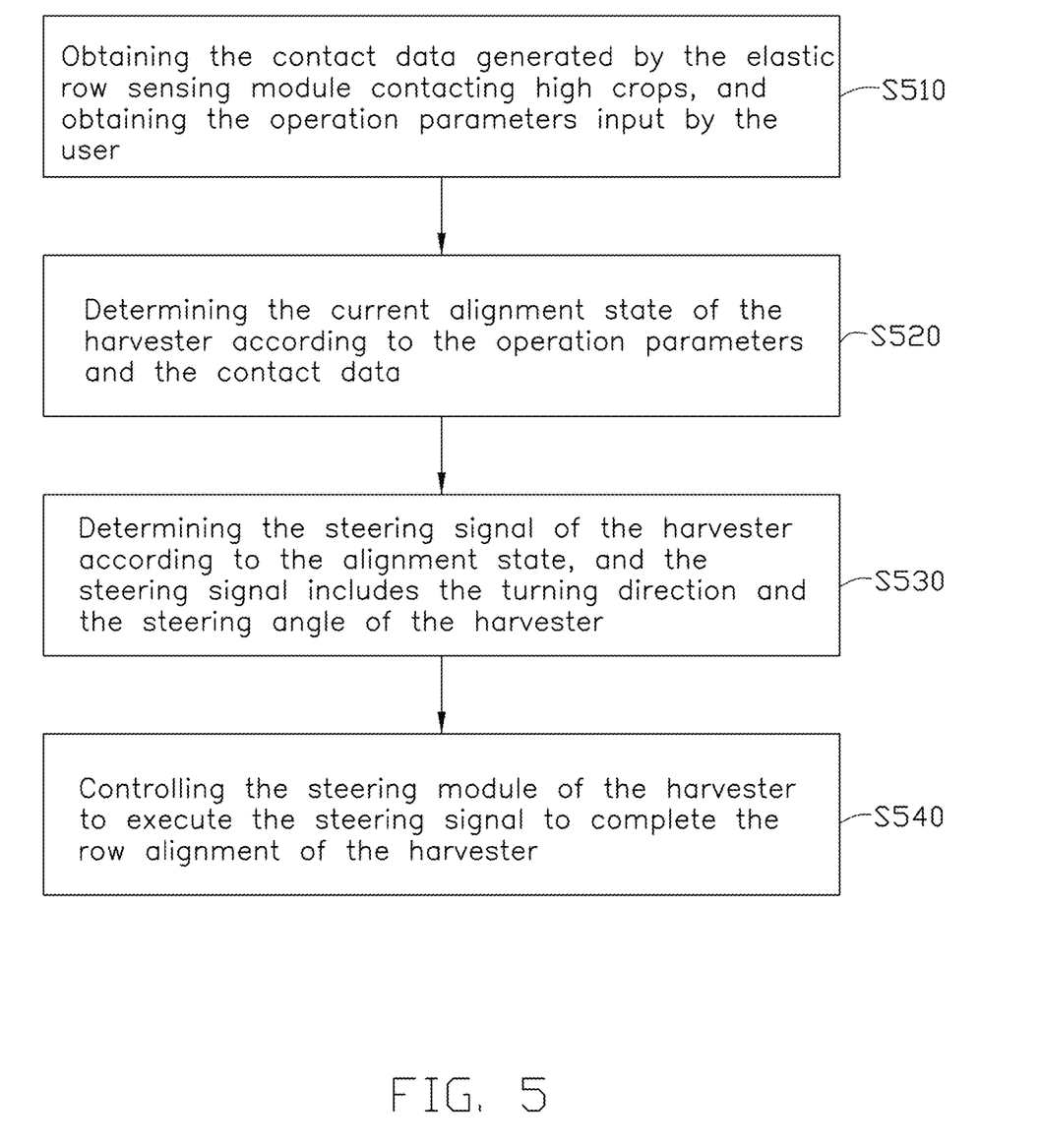
FIG. 5 is flowchart of an automatic row alignment driving method for high stem crop harvester according to a third embodiment of the present disclosure.

FIG. 5 is a flowchart depicting an embodiment of an automatic row alignment driving method for high stem crop harvester.

Each block shown in FIG. 5 represents one or more processes, methods, or subroutines, carried out in the example method. Furthermore, the illustrated order of blocks is illustrative only and the order of the blocks can change. Additional blocks can be added or fewer blocks may be utilized, without departing from the present disclosure.

The example method can begin at step S510.

At step S510, obtaining the contact data generated by the elastic row sensing module 100 in contact with high crops, and obtaining the operation parameters input by the user.

The method automatically carries out directional alignment when the harvester is operating. Therefore, it is necessary to drive the harvester to the farmland, and manually set the working direction, and then start the automatic alignment driving system or start the automatic alignment driving according to autonomous driving instructions.

At step S520, determining the current alignment state of the harvester according to the operation parameters and the contact data.

At step S530, determining the steering signal of the harvester according to the alignment state, the steering signal includes the turning direction and the steering angle of the harvester.

At step S540, controlling the steering module of the harvester to execute the steering signal to complete row alignment of the harvester.

Optionally, in some embodiments, the contact data includes first sensor data and second sensor data. The determination of the current alignment state of the harvester according to the operation parameters and the contact data includes:
extracting the feature value based on the first sensor data to obtain the first feature value, and extracting the feature value based on the second sensor data to obtain the second feature value.
comparing the first feature value and the second feature value with preset feature thresholds to determine the left-right alignment gap state.
determining whether the alignment is abnormal according to the left-right alignment gap state.
determining the offset direction and the offset amount or determining that the data is abnormal according to the first sensor data and the second sensor data if the alignment is abnormal.

In some embodiments, the left-right alignment gap state includes a gap on the left, a gap on the left, a gap on the right, and a gap on the right. The determination of the left-right paired row gap status includes:
determining that there is a gap on the left if the first feature value exceeds the preset feature threshold, otherwise, determining that there is no gap on the left;
determining that there is a gap on the right if the second feature value exceeds the preset feature threshold, otherwise determining that there is no gap on the right.

The embodiment provides an automatic row alignment driving method for high stem crop harvester, the elastomer arranged on the grain divider in the elastic row sensing module 100 is in direct contact with the high stem crop and is deformed by the contact, the sensor in the elastic row sensing module 100 generates the contact data according to the deformation of the elastomer, the processing module 200 analyzes the current alignment state according to the contact data, then the controlling module 300 calculates the steering direction and the steering angle according to the current alignment state, and sends the steering direction and the steering angle to the steering module 400 by the steering signal. Finally, the steering module 400 completes the steering action according to the steering signal to realize the automatic row alignment driving of the harvester. The system is based on the elastic row sensing module 100 assisting the harvester in automatic row operation, and there is no need to make more modifications to the harvester and the harvesting operation of the harvester is not affected. The system can automatically align the rows when the harvester is harvesting, realize accurate harvesting, improve the harvesting efficiency and the quality of harvested crops, and reduce the work of the driver by not requiring constant manual alignment or re-alignment by the driver.

Those skilled in the art can understand that the above embodiments are only examples, in which the features of different embodiments can be combined with each other to obtain implementations that are easily conceivable according to the disclosure of the present disclosure but are not clearly indicated in the drawings.

Those skilled in the art should understand that the above description and the embodiments of the present disclosure shown in the drawings are only examples and do not limit the present disclosure. The purpose of the present disclosure has been completely and effectively achieved. The functions and structural principles of the present disclosure have been shown and explained in the embodiments. Without departing from the principles, the implementation of the present disclosure may have any modification or variation.

What is claimed is:

1. An automatic row alignment driving system for high stem crop harvester comprising:
an elastic row sensing module configured to be disposed on a grain divider of the harvester, and having a profile to be in contact with stemmed crop and collect contact data; wherein the elastic row sensing module comprises multiple elastomers and multiple sensors, the elastomers are deformable, and the sensors are configured to detect deformation of the elastomers and generate the contact data;

a processing module configured to determine current alignment state of the harvester according to the contact data;

a controlling module configured to determine steering signal of the harvester according to the current alignment state; and a steering module configured to control the harvester to drive in alignment according to the steering signal;

wherein the elastic row sensing module comprises a first sensor, a second sensor, a first sensor trigger, a second sensor trigger, and a connector, two ends of the elastomer are configured to be attached to two respective sides of the grain divider, the first sensor and the second sensor are disposed on two opposite centers of the elastomer;

wherein the first sensor trigger and the second sensor trigger are fixed in the elastomer, the first sensor is installed to be coaxial with the first sensor trigger, the second sensor is installed to be coaxial with the second sensor trigger, the connector is connected to the first sensor and the second sensor, the connector is configured for power supply and communication for the first sensor and the second sensor.

2. The system according to claim 1, wherein the contact data comprises a first sensor data and a second sensor data, the processing module is configured to:

extract a feature value based on the first sensor data to obtain a first feature value, extract the feature value based on the second sensor data to obtain a second feature value;

compare the first feature value and the second feature value with a preset feature threshold to determine left-right alignment gap states;

determine whether the alignment is abnormal according to the left-right alignment gap states; and determine an offset direction and an offset amount or determine data is abnormal according to the first sensor data and the second sensor data if the alignment is abnormal.

3. The system according to claim 2, wherein the left-right alignment gap states comprise a gap on the left, no gap on the left, a gap on the right and no gap on the right; wherein determine left-right alignment gap states comprises:

if the first feature value is less than or equal to the preset feature threshold, the processing module determines there is a gap on the left, if the first feature value is greater than the preset feature threshold, the processing module determines there is no gap on the left; and if the second feature value is less than or equal to the preset feature threshold, the processing module determines there is a gap on the right; if the second feature value is greater than the preset feature threshold, there is no gap on the right.

4. The system according to claim 2, wherein the controlling module is configured to determine a steering direction and a steering angle of the harvester according to the offset direction and the offset amount, generate a steering signal according to the steering direction and the steering angle.

5. The system according to claim 3, further comprising: an alarm module;

wherein the processing module is configured to generate a warning signal when the left-right alignment gap state is a gap on the left and a gap on the right; and wherein the alarm module is configured to send a light alarm or a sound alarm according to the warning signal.

6. The system according to claim 1, further comprising:

an input module configured to obtain operation parameters;

wherein the operation parameters comprise operation spacing, offset values, sensor calibration, and voltage feature threshold; and the operation parameters are used in conjunction with the contact data to generate the steering signal.

7. The system according to claim 1, further comprising:

a positioning module configured to determine current position of the harvester;

an attitude module configured to determine current body state of the harvester; and a display module configured to display operating state of the harvester according to the current position, the current body state and the current alignment state.

8. An automatic row alignment driving method for high stem crop harvester comprising:

obtaining contact data generated by an elastic row sensing module contacting high stem crop, and obtaining operation parameters entered by a user;

determining current alignment state of the harvester according to the contact data and the operation parameters;

determining steering signal of the harvester according to the current alignment state; wherein the steering signal comprises a steering direction and a steering angle of the harvester; and controlling a steering module of the harvester to execute the steering signal, to control the harvester to drive in alignment;

wherein the elastic row sensing module comprises a first sensor, a second sensor, a first sensor trigger, a second sensor trigger, and a connector, two ends of an elastomer are configured to be attached to two respective sides of a grain divider, the first sensor and the second sensor are disposed on two opposite centers of the elastomer;

wherein the first sensor trigger and the second sensor trigger are fixed in the elastomer, the first sensor is installed to be coaxial with the first sensor trigger, the second sensor is installed to be coaxial with the second sensor trigger, the connector is connected to the first sensor and the second sensor, the connector is configured for power supply and communication for the first sensor and the second sensor.

9. The method according to claim 8, wherein the contact data comprises a first sensor data and a second sensor data; wherein determining current alignment state of the harvester according to the contact data and the operation parameters comprises:

extracting a feature value based on the first sensor data to obtain a first feature value, extracting the feature value based on the second sensor data to obtain a second feature value;

comparing the first feature value and the second feature value with a preset feature threshold to determine left-right alignment gap states;

determining whether the alignment is abnormal according to the left-right alignment gap states; and determining an offset direction and an offset amount or determine data is abnormal according to the first sensor data and the second sensor data if the alignment is abnormal.

* * * * *